United States Patent [19]

Ovshinsky et al.

[11] Patent Number: 4,537,674
[45] Date of Patent: Aug. 27, 1985

[54] ELECTROLYTIC CELL ANODE

[75] Inventors: Stanford R. Ovshinsky, Bloomfield Hills; Krishna Sapru, Troy; Gao Liang, Detroit, all of Mich.

[73] Assignee: Energy Conversion Devices, Inc., Troy, Mich.

[21] Appl. No.: 399,878

[22] Filed: Jul. 19, 1982

[51] Int. Cl.$^3$ .................. C25B 11/00; C25C 15/00
[52] U.S. Cl. .................. 204/290 R; 204/192 SP;
204/192 C; 502/101; 427/38; 427/39
[58] Field of Search ......... 204/192 SP, 290 R, 290 F,
204/192 C; 252/425.3; 427/38, 39; 502/101

[56] References Cited

U.S. PATENT DOCUMENTS

| | | | |
|---|---|---|---|
| 4,116,804 | 9/1978 | Needes | 204/290 R |
| 4,257,856 | 3/1981 | Beni | 204/192 SP |
| 4,275,126 | 6/1981 | Bergmann | 204/192 SP |
| 4,328,080 | 5/1982 | Harris | 204/192 SP |

*Primary Examiner*—John F. Niebling
*Attorney, Agent, or Firm*—Lawrence G. Norris

[57] ABSTRACT

An improved anode for acting as a catalyst for the oxygen evolution reaction in water electrolysis. The anode provides lower overvoltages, good kinetics, chemical and mechanical stability, low heat of oxygen adsorption and low operating costs. The anode material is formed from a host matrix including at least one transition element, preferably Co, Ni or Mn, which is structurally modified by incorporating one or more modifier elements, one of which may also be a transition element, to improve its catalytic properties. Modifier elements, including for example Co, Ni, Sr, Li, In, K, Sn, C, O, Mn, Ru and Al structurally modify the local chemical environments of the host matrix to provide a material having an increased density of catalytically active sites. The catalytic material can be formed by vacuum deposition techniques such as by cosputtering the host matrix and modifier elements to form a layer of catalytic material on an electrode substrate. The material may also include a leachable modifier element, such as Li, Al or Zn, which is partially removed to further modify the material and enhance its catalytic activity. After formation, the material may be subjected to a heat treatment in an oxygen containing atmosphere and/or subjected to an electrochemical treatment such as a cathodic treatment or a rapid anodic-cathodic pulsing to increase the catalytic activity of the material by forming highly active oxides. The electrochemical treatments significantly lower the overvoltages exhibited by the anodes of the present invention.

20 Claims, No Drawings

ELECTROLYTIC CELL ANODE

BACKGROUND OF THE INVENTION

The present invention relates generally to catalytic bodies and more specifically to catalytic bodies for use as anodes in electrolytic cells. The anodes provide low overvoltage, fast kinetics, chemical stability, good electrical conductivity, low heat of oxygen adsorption and good mechanical strength.

The electrolytic decomposition of water in an alkaline electrolyte has long been practiced for the production of hydrogen gas. The major components of the cell in which such electrolysis takes place usually includes an anode and a cathode which are in contact with an electrolytic solution, and a diaphragm or membrane separator in the cell to separate the anode and cathode and their reaction products. In operation, the selected electrolyte, such as NaOH, KOH or $H_2SO_4$ for example, is continually fed into the cell and a voltage is applied across the anode and cathode. This produces electrochemical reactions which take place at the anode and cathode to form oxygen and hydrogen gas, respectively. These reactions and the overall reaction is represented as follows:

| Cathode: | $2H_2O + 2e^- \rightarrow H_2 + 2OH^-$ |
| Anode: | $2OH^- \rightarrow \frac{1}{2} O_2 + 2e^- + H_2O$ |
| Total: | $H_2O \rightarrow H_2 + \frac{1}{2} O_2$ |

The particular materials utilized for the anode and cathode are important since they respectively provide the necessary catalysts for the reactions taking place at the anode and cathode. For example, the role which the anode catalyst M is believed to play in evolving oxygen in an electrolytic cell is as follows:

$M + OH^- \rightarrow MOH + e^-$ $MOH + OH^- \rightarrow MO + H_2O + e^-$ $2MO \rightarrow MO_2 + M$ $MO_2 \rightarrow O_2 + M$ In addition to allowing the desired reactions to take place, the catalytic efficiency of the catalytic materials is a very important consideration since an efficient catalytic material reduces the operating energy requirements of the cell. The applied voltage necessary to produce the anode and cathode reactions in an electrolytic cell is the sum of the decomposition voltage (thermodynamic potential) of the compounds in the electrolyte being electrolized, the voltage required to overcome the resistance of the electrolyte and the electrical connectors of the cell, and the voltage required to overcome the resistance to the passage of current at the surface of the anode and cathode (charge transfer resistance). The charge transfer resistance is referred to as the overvoltage. The overvoltage represents an undesirable energy loss which adds to the operating costs of the electrolytic cell.

The reduction of the overvoltage at the anode and cathode to lower operating cost of the cell has been the subject of much attention in the prior art. More specifically, as related to this invention, considerable attention has been directed at the reduction of overvoltage caused by the charge transfer resistance at the surface of the anode due to catalytic inefficiencies of the particular anode materials utilized.

The anode overvoltage losses can be quite substantial in electrolytic cells. For example, for nickel anodes or nickel plated steel anodes, the materials most commonly used by the water electrolysis industry, the charge transfer resistance is on the order of 400 mV at one set of typical operating conditions, e.g., a 30% KOH electrolyte at a temperature of 80° C. and current density of 2 $KA/m^2$. Because such cells are used to annually produce a significantly large amount of hydrogen, the total electrical energy consumed amounts to a very substantial sum in view of the high electrical energy cost. Such a large amount of energy is consumed that even a small savings in the overvoltage such as 30–50 mV would provide a significant reduction in operating costs. Furthermore, due to the trend of rapidly rising costs for electrical energy, the need for reduced overvoltages takes on added importance since the dollar value of the energy to be saved continually is increasing.

One reason nickel and nickel plated steel catalytic materials have been most commonly used for the electrolysis of water is because of their relatively low cost. Another reason is that these materials are resistant to corrosion in hot concentrated caustic solutions and have one of the lowest overvoltages among the non-noble metal materials for the oxygen evolution reaction. Nickel and nickel plated steel, however, as discussed above, are not particularly efficient catalysts and thus operate with considerable overvoltages. Nevertheless, the excessive overvoltages provided by nickel and nickel plated steel anodes have been reluctantly tolerated by the industry since an acceptable alternative anode material has not been available and the cost of electrical power until recently was not a major cost consideration.

A limitation in the efficiency of nickel anodes, as well as many other materials proposed for use as a catalytic material for anodes for an electrolytic cell, is that these materials are single phase or substantially single phase crystalline structures. In a single phase crystalline material the catalytically active sites which provide the catalytic effect of such materials result from accidently occurring, surface irregularities which interrupt the periodicity of the crystalline lattice. A few examples of such surface irregularities are dislocation sites, crystal steps, surface impurities and foreign absorbates.

A major shortcoming with basing the anode materials on a crystalline structure is that irregularities which result in active sites typically only occur in relatively few numbers on the surface of a single phase crystalline material. This results in a density of catalytically active sites which is relatively low. Thus, the catalytic efficiency of the material is substantially less than that which would be possible if a greater number of catalytically active sites were available for the oxygen or other gas evolution reaction at the anode. Such catalytic inefficiencies result in overvoltages which add substantially to the operating costs of the electrolytic cells.

One prior art attempt to increase the catalytic activity of the anode was to increase the surface area of the cathode by the use of a "Raney"-type process. Raney nickel production involves the formation of a multi-component mixture, from melted or interdiffused components such as nickel and aluminum, followed by the selective removal of the aluminum, to increase the actual surface area of the material for a given geometric surface area. The resulting surface area for Raney nickel anodes is on the order of 100-1000 times greater than the geometric area of the material. This is a greater surface area than the nickel and nickel plated steel anodes discussed above.

The Raney nickel anodes are very unstable and lack mechanical stability during gas evolution. The degradation reduces the operating life of Raney nickel anodes and thus they have not been widely accepted for industrial use. Furthermore, the process for producing Raney nickel is relatively costly due to the expense of the various metallurgical processes involved.

Many other anode materials have been prepared and tested at least on an experimental basis. For various reasons, however, these materials have not replaced nickel and nickel plated steel anodes as the most commonly used industrial anode materials. Some of these experimentally prepared anode materials include mixtures of nickel and other metals. The preparations have varied and include plasma spraying a mixture of cobalt and/or nickel along with stainless steel onto a nickel or nickel coated iron substrate; subjecting a nickel molybdate material to a anodic polarization procedure to remove the molybdenum therefrom to form a finely divided nickel oxide; nickel sinters impregnated with precipitated nickel (II) hydroxide; and a spinel $NiCo_2O_4$ material prepared as a powder by freeze drying or by co-precipitation from a solution of mixed salts.

Another prior art approach to lower the overvoltage of anode catalysts has been centered around the use of materials which are inherently better catalysts than nickel. Certain compositions including noble metals can provide catalysts which exhibit lower overvoltages during utilization as an anode catalyst, but these materials have other major drawbacks which have prevented a widespread acceptance by industrial users of electrolytic cells. These materials are much too expensive for efficient commercial use, are relatively scarce and are usually obtained from strategically vulnerable areas. Another drawback is that once placed into operation in an electrolytic cell, further degradation problems arise since the noble metal including materials are quite susceptible to "poisoning".

Poisoning occurs when the catalytically active sites of the material become inactivated by poisonous species invariably contained in the electrolytic solution. These poisonous species may, for example, include residual ions contained in untreated water used in the electrolyte such as ions of the normal impurities found in water, Ca, Mg, Fe and Cu. Once inactivated such sites are thus no longer available to act as a catalyst for the desired reaction and catalytic activity is reduced increasing the overvoltage losses.

In summary, various catalytic materials for use as electrolytic cell anodes have been proposed. Nickel and nickel plated steel anodes have been most commonly commercially used. These materials are catalytically inefficient resulting in considerable overvoltages which add significantly to operating costs. Those materials which exhibit lower overvoltages, such as noble metal including catalysts, are expensive and/or subject to poisoning. Other anode materials which exclude noble metals have been proposed, but it appears that such materials do not improve the overall anode performance in terms of overvoltage savings, material costs and operating life since such prior art anodes have not been accepted to any significant degree. Thus, there remains the need for a stable, low overvoltage anode material of low cost to replace the presently used catalytic materials for oxygen evolution in an electrolytic cell.

SUMMARY OF THE INVENTION

The disadvantages of the prior art are overcome by providing disordered multicomponent catalytic materials which can be tailor-made to exhibit optimum catalytic activity for oxygen evolution in an electrolyte cell. An electrochemical treatment, which may be either a cathode treatment or rapid electrical pulsing treatment, further increases catalytic activity of the tailor-made materials. The catalytic materials provided by the present invention have a greater density of active sites, resistance to poisoning, chemical and mechanical stability, good electrical conductivity, low heat of oxygen adsorption and low operating cost. The increased catalytic activity of the materials of the present invention serves to significantly reduce the overvoltages exhibited by the anode of an electrolytic cell and increase the resistance to poisoning to thereby reduce operating costs.

The improved anodes are formed from non-equilibrium metastable highly disordered materials formed by modification technique. The technique of modification to provide a high degree of disorder provides orbital overlap and a spectrum of catalytically active sites for the oxygen evolution reaction.

The catalytic materials of the present invention are formed from a wide range of compositions in desired nonstoichiometric structural configurations so as to exhibit optimum catalytic activity. The modification technique involves tailoring of the local structural and chemical order of the materials of the present invention and is of great importance to achieve the desired characteristics. Amorphous materials having only short range order can be utilized as can crystalline materials having long range order, but where the structure is deliberately modified to increase the density of catalytically active sites above that obtainable in the prior art.

The improved catalytic activity of the present invention is accomplished by manipulating the local chemical order and hence the local structural order by the incorporation of selected modifier elements into a host matrix to create the desired disordered material. The desired multicomponent disordered material can be amorphous, polycrystalline (but lacking long range compositional order), or microcrystalline in structure or an intimate mixture of any combination of those phases.

The host matrix of the present invention includes at least one transition element and at least one modifier element such as a transition element introduced into the host matrix in a non-equilibrium manner. The incorporation of the modifier element or elements in this manner acts to disorder the structure of the material and to create local structural chemical environments which are capable of acting as catalytically active sites for the oxygen evolution reaction. The utilization of a disordered structure allows the creation of an increased density and a wide spectrum of catalytically active sites to yield materials which have high catalytic efficiency and result in reduced overvoltages.

The disordered materials of the present invention also can be formed with a high surface area by the incorporation of aluminum, zinc or the like, which are then leached out, preferably only partially, of the material without effecting the stability of the material. This is in contrast to the Raney nickel process which results in an unstable material.

The materials are preferably formed as a layer on a substrate which can be of conventional configurations and materials. Deposition of the components forming the catalytic layer can be accomplished by vacuum deposition techniques, such as cosputtering. Such methods are advantageous since they allow a very intimate mixing of the components on an atomic scale to provide the desired disordered structure and create local structural chemical environments which have catalytically active sites.

In some cases a post deposition heat treatment was given to form the active oxide. Typically, the treatment can be carried out in air at 350° C. for about one hour.

Another post deposition involves subjecting the anodes to cathodic pulsing. This electrochemical treatment can be accomplished, for example, by placing the anode material in an electrolytic solution and subjecting it to a cathodic treatment typically conducted at $-0.01$ to $-0.1$ A/cm$^2$ for one minute, or by subjecting the anode material to rapid anodic-cathodic pulsing typically conducted at $\pm 0.1$ A/cm$^2$ for thirty seconds. These treatments form very catalytically active oxides which can lower overvoltages up to 80 mV at 1 KA/m$^2$ over that yielded by the material before treatment.

DETAILED DESCRIPTION

The present invention provides multicomponent materials having tailor-made local structural chemical environments which are designed to yield excellent catalytic characteristics for electrolytic cell anodes. The anodes have lower overvoltage, good kinetics, chemical and mechanical stability, good electrical conductivity and low operating costs. The manipulation of local structural chemical environments to provide catalytically active sites is made possible by utilization of a host matrix having at least one transition element which can, in accordance with the present invention, be structurally modified with at least one other element, such as another transition element, to create a greatly increased density of catalytically active sites for the anode reaction in an electrolytic cell, such as the oxygen evolution reaction for the electrolysis of water.

With a greater density of catalytically active sites the reaction between the catalytically active sites and hydroxyl ions (M+OH$^-$→MOH+e$^-$) occurs much more readily to thereby improve kinetics of oxygen formation. Furthermore, due to the high density of catalytically active sites, the probability of the bonded oxygen atoms reacting with each other to form oxygen gas (2MO→MO$_2$+M and MO$_2$→O$_2$+M) is significantly increased. The increased catalytic activity of the materials of the present invention can yield a material having a charge transfer overvoltage which is up to 150 mV lower than that exhibited by nickel anodes under similar operating conditions.

The increased numbers of catalytically active sites not only reduces overvoltages, but enables the materials to be more resistant to poisoning. This is because with materials of the present invention, a certain number of catalytically active sites can be sacrificed to the effects of poisonous species, while a large number of unpoisoned sites still remain to provide the desired catalysis for the reactions at the anode.

The disordered materials of the present invention, are ideally suited for manipulation since they are not constrained by the symmetry of a single phase crystalline lattice or by stoichiometry. By moving away from materials having restrictive single phase crystalline symmetry, it is possible by selectively modifying in accordance with the present invention to accomplish a significant alteration of the local structural chemical environments involved in the anode reaction to enhance the catalytic properties of the anode materials. The disordered materials of the present invention can be modified in a substantially continuous range of varying percentages of modifier elements. This ability allows the host matrix to be manipulated by the modifier elements to tailor-make or engineer materials with characteristics suitable for the desired anode reaction. This is in contrast to crystalline materials, which generally have a very limited range of stoichiometry available and thus a continuous range of control of chemical and structural modification of such crystalline materials is not possible.

In the disordered materials of the present invention, it is possible to attain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix to readily modify the local structural chemical order and thus the electronic configurations of the matrix to provide numerous catalytically active sites.

The disorder of the modified material can be of an atomic nature in the form of compositional or configurational disorder provided throughout the bulk of the material or in numerous regions of the material. The disorder can also be introduced into the material be creating microscopic phases within the material which mimic the compositional or configurational disorder at the atomic level by virtue of the relationship of one phase to another. For example, the disordered materials can be created by introducing microscopic regions of a different kind or kinds of crystalline phases, or introducing regions of an amorphous phase or phases in addition to regions of a crystalline phase or phases. The interfaces between these various phases can provide surfaces which are rich in local chemical environments providing numerous catalytically active sites.

A major advantage of these disordered materials is that they can be tailor-made to provide a very high density of active catalytic sites relative to materials based upon a single phase crystalline structure. The types of structures which provide the local structural chemical environments for improved catalytic efficiency in accordance with the present invention include multicomponent polycrystalline materials lacking long range compositional order, microcrystalline materials, amorphous materials having one or more phases, or multiphase materials containing both amorphous and crystalline phases or mixtures thereof.

The anodes of the present invention can be formed by several methods. In the one method, a substrate is utilized onto which a layer of catalytic material is applied. The substrate can be in the conventional used forms such as sheet, expanded metal, wire, or screen configurations. The composition of the substrate can be nickel, steel, titanium, graphite, copper or other suitable materials. Preferably the substrate is sandblasted to provide better adhesion for the later applied catalytic layer. The layer of catalytic material of the invention can be applied to the substrate by vacuum deposition of the components (i.e., sputtering, vapor deposition, plasma deposition or spraying). Such methods also offer ease and economy of preparation and enable the preparation of catalytic materials of any desired compositional range. The thickness of the layer preferably is on the order of ½ to 50 microns.

Cosputtering is a particularly suitable method for forming the materials of the present invention because it facilitates modification of the host matrix on an atomic scale, thus enabling tailor-making of the material and also allowing for the formation of an intimate mixture of the material's component elements. Thus, the host matrix and modifier elements can be deposited in non-equilibrium metastable positions to tailor-make the desired type and degree of disordered materials and create new local structural chemical environments providing the desired catalytically active sites.

The catalytic layer may also initially include leachable components like aluminum or zinc which are subsequently partially leached out to leave a layer of a higher surface to volume ratio, which increases catalytic activity and further modifies the catalytic material.

Material Preparation

A number of materials were prepared and tested to illustrate the advantages of the disordered catalytic materials of the present invention and the enhancement of catalytic activity provided by cathodic and rapid pulsing electrochemical treatments. The materials referred to hereinafter were prepared and tested in general accordance with the following procedures except where noted differently.

Nickel plated mild steel in a sheet or screen form were used as the anode substrates although any suitable conductive substrate can also be utilized. The substrates were sandblasted to remove surface oxides and to roughen the surfaces to provide better adhesion for the later applied catalytic layer. The substrate was placed in a vacuum chamber of a Mathis R.F. sputtering unit chamber, or in some instances a Sloan Magnetron 1800 Sputtering unit. The chamber was evacuated to a background pressure of $1 \times 10^{-6}$ torr. Argon gas was introduced into the chamber at a partial pressure of approximately $6.0 \times 10^{-3}$ torr. When reactive sputtering to form oxides of the deposited materials was desired to be accomplished, oxygen gas was included in the chamber along with the argon. The amount of oxygen was typically 1–5% by volume.

The Mathis sputtering target included a surface having sections of the elements desired to be included in the catalytic layer. The relative percentages of the elements contained in the deposited disordered materials were dependent upon the relative sizes of the sections of the target dedicated to the component elements and the positioning of the substrate relative to the target.

With the Sloan 1800 Magnetron sputtering unit, however, each element which was to be a component of the final catalytic layer had a separate target dedicated only to that element and the relative percentages of the component elements deposited in the catalytic layer were controlled by adjustment of the magnetic flux associated with each target as is well known by those skilled in this art. Regardless of whether the materials were produced utilizing the Mathis or Sloan Units, the substrate was maintained at a relatively low temperature, for example 50° C. to 150° C., to aid in the formation of a desired disordered structure. The thickness of the catalytic layers deposited on the substrate were on the order of ½ to 50 microns.

Some of the materials prepared had a component initially included therein and partially removed by leaching after formation of the cosputtered layers. Components such as Al, Zn or Li are suitable for this purpose. The leaching of these materials was typically accomplished in a one molar NaOH solution at a temperature of 65° C. to 100° C. The duration of leaching was typically 1 to 4 hours.

Many of the materials were subjected to at least one post-treatment such as a heat treatment in oxygen or electrochemical treatment to form oxides which are the most active oxides for the oxygen evolution reaction of an electrolyte cell. Generally for oxygen evolution a narrow range of oxides are significantly more catalytically active. Thus, certain post-treatments were performed to provide an increased density of the oxides with decreased resistance in order to lower overvoltages exhibited by the materials. Some treatments to form oxides which are the most catalytically efficient were accomplished electrochemically, such as by subjecting the anodes to a cathodic treatment typically conducted at $-0.01$ to $-0.1$ A/cm$^2$ for a few seconds to one minute in an alkaline solution. Another electrochemical treatment was accomplished by rapid anodic-cathodic pulsing for approximately thirty seconds at a current density of plus or minus 0.1 A/cm$^2$, also in an alkaline solution.

The chemical composition of the catalytic layer was determined by energy dispersive spectroscopy or Auger spectroscopy. All chemical compositions stated in the following examples are given in atomic percentages.

Except where noted differently, the materials were tested in a half-cell utilizing 17% by weight NaOH as the electrolyte at a temperature of approximately 80° C. The oxygen evolution potential required to produce various current density per square meter of anode surface area was measured with respect to a Hg/HgO reference electrode in the same electrolyte. The current densities were calculated using the geometric surface area of one side of the electrode. The overvoltages were then calculated by subtracting the thermodynamic potential of the reaction, which, for example, is approximately 270 mV at current density of 1 KA/m$^2$ under these operating conditions.

For a comparison to the overvoltages provided by the materials of the present invention, a nickel anode was prepared from a sheet of sandblasted nickel or nickel plated mild steel and tested in the same test cell under the same operating conditions as the materials of the present invention. The nickel anodes exhibited 360 mV to 390 mV overvoltages at approximately 80° C. and a current density of 1 KA/m$^2$ (with or without IR correction), and overvoltages of approximately 442 mV to 490 mV (not IR corrected) and about 420 mV (IR corrected) at a current density of 5 KA/m$^2$.

TABLE 1

Representative Results of Oxygen Evolution Anode Materials Formed By Cosputtering

| Material Composition | Overvoltages in mV (IR corrected) at | |
|---|---|---|
| | 1 KA | 5 KA |
| Ni$_6$Co$_{79}$Sr$_{15}$ | 357 | 399 |
| Ni$_{15}$Co$_{85}$* | 334 | 370 |
| Co$_{65}$Ni$_{28}$In$_7$ | 345 | 384 |
| Co$_{77}$Ni$_6$Sn$_{17}$ | 341 | 377 |
| Ni$_{32}$Co$_{51}$Mn$_{17}$ | 342 | 380 |

TABLE 1-continued

Representative Results of Oxygen Evolution Anode Materials Formed By Cosputtering

| Material Composition | Overvoltages in mV (IR corrected) at | |
|---|---|---|
| | 1 KA | 5 KA |
| $Co_{39}O_{34}Li_{25}C_2$ | 331 | 378 |

*Reactively sputtered in 1% oxygen and 99% argon atomosphere.

A number of modified materials were prepared in accordance with the present invention to provide anodes which gave superior performance over that obtained by a nickel anode tested under substantially identical conditions. Some representative results of these anodes are shown in Table 1 above. Most of these materials included Co and Ni and some were formed by reactively co-sputtering the components in the presence of an oxygen atmosphere $O_2$ thereby form a nickel-cobalt oxide material. Other materials were sputtered in the presence of 100% argon gas. All of the anode materials of Table 1 had overvoltages lower than Ni, with overvoltage savings generally 30–50 mV.

TABLE 2

Representative Results of Oxygen Evolution Anode Materials Formed By Cosputtering and Subjected to Cathodic Pulsing Treatment

| Material Composition | Overvoltages in mV (not IR corrected) at | | |
|---|---|---|---|
| | 1 KA/m² | 2 KA/m² | 5 KA/m² |
| $Ni_{56}Co_{44}$ | 295 | 324 | 390 |
| $(Ni_{85}Co_{15})_{45}O_{55}$ | 288 | 310 | 358 |
| $Co_{80}Fe_{20}$ | 300 | 320 | 380 |
| $Ni_{63}Al_{26}C_7O_4$ | 295 | 322 | 380 |
| $Ni_{31}Co_{65}Ru_4$ | 300 | 350 | 430 |

Table 2 shows some representative samples of anodes which were prepared by co-sputtering the components as described above and thereafter subjected the anodes to a cathode pulsing treatment. The non-IR corrected nickel anodes had overvoltages on the order of 390 mV at 1 KA/m², 420 mV at 2 KA/m² and 490 mV at 5 KA/m². Overvoltage savings over the nickel anodes are 90 mV and greater at 1 KA/m² current density, 70 to 110 mV at 2 KA/m² and 60 to 130 mV at 5 KA/m².

Comparison of overvoltages of anodes before and after cathodic treatments were also made. Generally, the treatment was found to lower overvoltages by approximately 20 to 35 mV. For example, a cathodic treatment at $-0.1$ A/cm² was performed on a $(Co_{85}Ni_{15})$ oxide anode for 23 minutes. At all current densities tested, the cathodically treated anode yielded lower overvoltages than the untreated $(Co_{85}Ni_{15})$ oxide anode. At a 1 KA/m² current density the overvoltage was further reduced approximately 20 mV.

As another example, the rapid anodic-cathodic pulsing treatment was performed on a series of oxide materials formed by reactive sputtering. These materials were prepared utilizing Ni as the host matrix and Co as a modifier element and sputtering in a 5% $O_2$ and 95% Ar gas mixture. Prior to post-treatment the materials exhibited overvoltages on the order of 30 mV lower than the nickel anode. After a rapid pulsing treatment of $\pm 0.1$ A/cm² for three seconds was performed however, considerable improvement resulted. For example, after treatment a $Ni_{85}Co_{15}$ material yielded an overvoltage of approximately 320 mV, about 30 mV lower than before treatment. The (Ni—Co) oxide materials were also heated in argon to determine the effect of such treatment on the current density obtained by the anodes for a given cell voltage. It was determined that when the heat treatment in argon was combined with a cathodic treatment significant increases in current densities were obtained.

Co—Ni anodes which were formed by sputtering in 100% argon also provided lower overvoltages than the nickel anodes. The materials of the series which were not post-treated exhibited overvoltages which were in the range of approximately 40 to 45 mV better than the nickel anode at a current density of 1 KA/m². A rapid pulsing treatment ($\pm 0.5$ A/cm², 30 seconds) increased performance of the materials to provide up to approximately a 70–75 mV reduction in overvoltage over the nickel anode. The cathodic treatment ($-0.1$ A/cm², 1 minute) provided even greater improvement, yielding an overvoltage reduction of approximately 80–85 mV over nickel anodes at 1 KA/m² current density. These post-treatments also significantly improved the current density obtained at a given cell voltage.

A number of materials were also prepared by co-sputtering Ni, C, and Al in a 5% by volume oxygen and 95% by volume argon atmosphere. These materials were subjected to various treatments after sputtering to determine the effect of the treatments of the present invention on their performance. These materials showed very good catalytic efficiency for the oxygen evolution reaction providing overvoltage savings on the order of up to 80 to 85 mV over the nickel anode at a 1 KA/m² current density. The partial leaching of aluminum modifier elements to increase the surface area of the anodes provided materials yielding lower overvoltages and higher current densities for a given voltage. A subsequent rapid anodic-cathodic pulsing treatment of these materials provided further decreases in overvoltages and increases in current densities. While annealing the leached materials alone did not improve performance, a subsequent cathodic or rapid pulsing treatment after annealing greatly improved performance and provided materials exhibiting some of the lowest overvoltages and highest current densities obtained by this series.

A number of materials were also prepared by co-sputtering Co and modifying with Ni and at least a third element selected from the group consisting of (Ru, Sn, In, and Sr). Both the untreated and treated CoNiRu materials provided significant overvoltage savings over the nickel anode. A $Co_{65}Ni_{28}Ru_7$ material subjected to a cathodic-anodic pulsing provided an 80 mV overvoltage savings over nickel anodes at a 1 KA/m² current density. CoNiIn, CoNiSn and CoNiSr anodes of the present invention provided up to 20 mV to 35 mV overvoltage savings over Ni.

Other anode materials prepared and tested included titanium-ruthenium oxides. These materials were formed by reactively sputtering Ti and Ru onto a substrate in a 1% $O_2$ and 99% Ar gas mixture. An anode catalyst formed of a $Ti_{52}Ru_{48}$ material showed 50 mV overvoltage savings over nickel anodes at 1 KA/m².

In summary, the most suitable components for the catalytic materials of the present invention are Co, Ni and Mn as elements for the host matrix, and Co, Ni, Sr, Li, K, Sn, C, O, Mn, Al and Ru as modifier elements. A TiRu oxide material also provides a good catalyst for the oxygen evolution reaction of an electrolytic cell.

LIFE TEST

Life testing was performed to determine the stability of the anodes over an extended period of time for the catalytic materials of the present invention. In one cell the anode material was a reactively sputtered ($Ni_{15}Co_{85}$) oxide which was tested for over 4600 hours. The anode had overvoltages (not IR corrected) of 295 mv at 1 $KA/m^2$, 345 mV at 2 $KA/m^2$ and 465 mV at 5 $KA/m^2$. A second cell utilized a $Ni_{56}Co_{44}$ material which was tested for 1200 hours. The anode had overvoltages set forth in Table 2. In another cell a $Ni_{50}Al_{44}C_3O_3$ material was tested for 500 hours. The anode had overvoltages (not IR corrected) of 305 mV at 1 $KA/m^2$, 338 mV at 2 $KA/m^2$ and 410 mV at 5 $KA/m^2$. A Hg/HgO reference electrode was utilized to determine the cell voltage. The anode materials tested provided extremely stable cell voltages during the life tests.

Utilization of the materials of the present invention need not be limited to layers of catalytic material applied to a substrate. The entire bulk of the anode can be formed of the catalytic materials of the invention without utilizing a substrate to thereby provide a much greater thickness of catalytic material.

From the foregoing it can be seen that the disordered catalytic materials of the present invention can be utilized for an anode in an electrolytic cell to reduce overvoltages over those of the most commonly used anode materials for water electrolysis, nickel and nickel plated steel. Furthermore, the materials of the present invention, are very resistant to poisoning as exhibited by their stable performance during life testing. Moreover, the materials of the present invention can be made from relatively low cost components and can be produced by relatively simple methods to provide low cost energy saving anodes.

While the present invention has been described in conjunction with specific embodiments, those of normal skill in the art will appreciate that modifications and variations can be made without departing from the scope of the present invention. Such modifications and variations are envisioned to be within the scope of the appended claims.

What is claimed and desired to be secured by Letters Patent of the United States is:

1. A multicomponent compositionally disordered catalytic material for use as an anode catalyst in an electrolytic cell comprising:
   a host element having at least one transition element, said host matrix having incorporated therein one or more modifier elements, said modifier element selected from a group consisting of Co, Ni, Sr, Li, K, In, Sn, C, Mn, Ru and Al, said modifier element modifying the local structural and chemical environments throughout the bulk of said material to provide the disorder and create an increased density of catalytically active sites for oxygen gas evolution in an electrolytic cell, said material having at least one amorphous phase, microcrystalline phase, polycrystalline phase lacking long-range compositional order, or any combination of these phases.

2. The catalytic material of claim 1 wherein said at least one of said modifier elements is a transition element other than said transition element forming said host matrix.

3. The catalytic material as defined in claim 1 wherein said host matrix element is selected from the group consisting of Co, Ni, and Mn.

4. The catalytic material as defined in claim 1 wherein said material includes Ti and Ru.

5. The catalytic material as defined in claim 1 wherein said catalytic material forms at least part of a cathode for an electrolytic cell.

6. The catalytic material as defined in claim 1 wherein said catalytic material is formed by vacuum deposition techniques.

7. The catalytic material as defined in claim 1 wherein said material is in the form of a layer formed by cosputtering said host material element and said modifier element.

8. The catalytic material as defined in claim 1 wherein said catalytic material is heat treated to incorporate oxygen into said material to further disorder and modify said material.

9. An anode for an electrolytic cell said anode comprising:
   (a) a substrate;
   (b) a layer of a compositionally disordered multicomponent catalytic material applied to said substrate, said material including a first element comprising at least one transition metal element forming a host matrix, and said host matrix having incorporated therein at least one modifier element, said modifier element selected from a group consisting of Co, Ni, Sr, K, In, Sn, C, Mn, Ru and Al, said modifier element structurally modifying the local structural chemical environments throughout the bulk of said material to provide said disorder and create an increased density of catalytically active sites which are capable of acting as a catalyst for oxygen evolution in an electrolytic cell, said material having at least one amorphous phase, microcrystalline phase, polycrystalline phase lacking long-range compositional order, or any combination of these phases.

10. The anode as defined in claim 9 wherein said at least one host matrix element is selected from the group consisting of Ni, Mn and Co.

11. The anode as defined in any one of claims 9 or 10 wherein said catalytic material includes Ti and Ru.

12. The anode as defined in any one of claims 9 or 10 wherein said catalytic material forms at least part of a anode for an electrolytic cell.

13. The anode as defined in any one of claims 9 or 10 wherein said layer is approximately 0.5 to 50 microns thick.

14. The anode as defined in any one of claims 9 or 10 wherein said material is in the form of a layer formed by cosputtering said host material element and said modifier element.

15. The anode as defined in any one of claims 9 or 10 wherein said catalytic material is heat treated to incorporate oxygen into said material to further disorder and modify said material.

16. A method of forming an anode for use in an electrolytic cell comprising:
   forming a host matrix from at least one transition element and,
   structurally modifying said host matrix by vacuum depositing of at least one modifier element to provide a disordered catalytic active material throughout the bulk of said material and create an increased density of catalytically active sites which are capable of acting as a catalyst for oxygen evolution in an electrolytic cell, said modifier element selected from a group consisting of Co, Ni, Sr, Li, K, In, Sn, C, Mn, Ru and Al, said material having at least one amorphous phase, microcrystalline phase, polycrystalline phase lacking long-range compositional order, or any combination of these phases.

17. The method as defined in claim 16 wherein said at least one host matrix element is selected from the group consisting of Co, Ni and Mn.

18. The method of claims 16 or 17 wherein aluminum is included as a modifier element and said aluminum is partially selectively removed from said material to further enhance its catalytic properties.

19. The method of claim 16, further including: applying said material to a substrate.

20. The method of claim 16, further including: applying said material to substrate by cosputtering said elements onto a substrate to form a layer of said material thereon.

* * * * *